(12) United States Patent
Harris

(10) Patent No.: US 6,582,030 B2
(45) Date of Patent: *Jun. 24, 2003

(54) BACK-UP BRAKING IN ELECTRO-HYDRAULIC (EHB) BRAKING SYSTEM

(75) Inventor: Alan Leslie Harris, Coventry (GB)

(73) Assignee: Lucas Industries plc (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,477

(22) Filed: Nov. 1, 2001

(65) Prior Publication Data

US 2002/0117891 A1 Aug. 29, 2002

Related U.S. Application Data

(63) Continuation of application No. PCT/GB00/01122, filed on Mar. 24, 2000.

(30) Foreign Application Priority Data

May 5, 1999 (GB) .............................................. 9910193

(51) Int. Cl.⁷ ........................... B60T 17/18; B60T 13/66
(52) U.S. Cl. ............................................. 303/3; 303/15
(58) Field of Search .......................... 188/151 R, 156; 303/3, 15, 20, 122

(56) References Cited

U.S. PATENT DOCUMENTS

| | | | |
|---|---|---|---|
| 5,139,315 A | | 8/1992 | Walenty et al. |
| 5,180,038 A | * | 1/1993 | Arnold et al ............... 188/171 |
| 5,310,251 A | | 5/1994 | Towers et al. |
| 5,318,355 A | | 6/1994 | Asanuma et al. |
| 5,979,999 A | | 11/1999 | Poertzgen et al. |
| 6,019,436 A | | 2/2000 | Siepker |
| 6,406,102 B1 | * | 6/2002 | Arnold ........................ 303/20 |
| 2001/0023799 A1 | * | 9/2001 | Engelhard ............... 188/151 R |

FOREIGN PATENT DOCUMENTS

| | | |
|---|---|---|
| EP | 0 825 081 A1 | 2/1998 |
| WO | WO 97 41016 A | 11/1997 |
| WO | WO 00/68053 | 11/2000 |

OTHER PUBLICATIONS

European Patent Office / Patent Abstracts of Japan, Abstract of Publication No. 05199605 (Publication Date Jun. 8, 1993), copyright 1993 JPO & Japio.

* cited by examiner

Primary Examiner—Christopher P. Schwartz
(74) Attorney, Agent, or Firm—MacMillian, Sobanski & Todd, LLC

(57) ABSTRACT

An electro-hydraulic braking system of the type which operates normally in a brake-by-wire mode wherein hydraulic pressure is applied to braking devices at the vehicle wheels in proportion to the driver's braking demand as sensed electronically at a brake pedal (10), and which, if the brake-by-wire mode should fail, operates in a push-through mode wherein hydraulic pressure is applied to the braking devices at the vehicle wheels by way of a master cylinder (34) coupled mechanically to the brake pedal (10), the system including also an electric parking braking device for enabling the braking devices to be actuated for parking braking purposes but which is also arranged to be activated to supplement push-through braking in the event of failure of the brake-by-wire mode. Electro-hydraulic braking at the rear axle of the vehicle is allowed only when a control unit (13) of the electro-hydraulic braking system has confirmation that the electric parking device is in a satisfactory operational state.

5 Claims, 2 Drawing Sheets

BACK-UP BRAKING IN ELECTRO-HYDRAULIC (EHB) BRAKING SYSTEM

CROSS REFERENCE TO RELATED APPLICATIONS

This application is a continuation of PCT application number PCT/GB00/01122 filed Mar. 24, 2000, which further claims priority to Great Britain Application GB 9910193.3 filed May 5, 1999, the disclosures of which are incorporated herein by reference.

BACKGROUND

The present invention is concerned with improving braking performance within the context of electro-hydraulic (EHB) braking systems during back-up braking in push-through mode.

SUMMARY OF THE INVENTION

A typical EHB system for a vehicle comprises a brake pedal, respective braking devices which are connected to the vehicle wheels and which are capable of being brought into communication with electronically controlled proportional control valves in order to apply hydraulic fluid under pressure to the braking devices, a hydraulic pump driven by an electric motor, and a high pressure hydraulic pressure accumulator fed by said pump for the provision of hydraulic fluid under pressure which can be passed to the braking devices via the proportional control valves in order to apply hydraulic fluid under pressure to the braking devices in so called "brake by wire" more in proportion to the driver's braking demand as sensed at the brake pedal. The EHB system is controlled by an electronic controller (ECU).

In order to enable the vehicle to be braked in conditions where, for some reason, the EHB system has become inoperative, for example because of a major component failure, it is usual in vehicles fitted with EHB to include a mechanical back-up system comprising a master cylinder which is linked to the brake pedal and which can be arranged to be coupled hydraulically to respective brake actuators at the front wheels to provide at least some braking in the event of total EHB failure. This is known as the "push-through" mode of braking. In order to make the EHB system "feet" like a conventional braking system in the "push-through" mode of braking, a travel simulator is also usually provided which is connected hydraulically to the master cylinder coupled to the brake pedal and which allows, by increasing the volume under pressure, the brake pedal to be depressed to an extent comparable with that of conventional systems.

The performance of an electro-hydraulic braking system (EHB) in its back-up (push-through) operating mode is, however, not as good as when the EHB is working normally in that there is no braking at all at the rear axle and no booster function for the action of the hydraulic cylinder.

Some prior art systems provide 4-wheel push-through, but do not isolate the power-circuit fluid from that in the hydrostatic push-through circuit. This makes the push-through function vulnerable to fluid aeration.

One could in principle provide 4-wheel push-through braking, but only by using two more isolating pistons, two more isolation solenoid valves and a larger master cylinder. However, this would be unacceptable due to the cost, packaging and considerations of additional heat dissipation and electrical energy consumption.

Some vehicles are now fitted with electrically operated parking brake systems wherein, for parking purposes, the normal braking devices, in addition to being actuable hydraulically, can be brought into a braking condition electrically. For example, the brake actuator can include a piston which is drivable by a reversible electric motor to apply and retract the brake shoes from a brake disc for respectively applying and releasing pad braking.

For vehicles equipped with both EHB (Electro-Hydraulic Braking) and EPB (Electric Parking Braking) a possibility might appear to be to arrange for the park brake to be applied whenever the EHB system is not working, for example using the signal from the brake light switch (BLS) or using the first pedal travel signal.

To achieve this, the ECU of the EPB system would need to receive a signal indicating the operating status of the EHB system. With such an arrangement, whenever the EHB is working correctly, then the EPB would receive the EHB status signal and respond only to the normal parking-brake control. On the other hand, if the EHB status signal is not received by the ECU of the EPB, indicating that the EHB is not operational then the parking brake will be allowed to respond, not only to the parking brake control, but also to the operation of the brake pedal. Braking will then be obtained from both the push-through operation and the EPB.

However, such a system has the potential problem that failure of the status signal link between the ECUs in the EHB and EPB, for example by way of an open-circuit connector fault, could allow the EPB to operate in response to brake pedal signals at times when the EHB was actually still operational. The additional brake torque resulting from both systems operating together could cause severe over-braking at the rear axle, with a consequential risk of vehicle instability.

In accordance with the present invention, there is provided an electro-hydraulic braking system of the type which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, operates in a push-through mode wherein hydraulic pressure is applied to the braking devices at the vehicle wheels by way of a master cylinder coupled mechanically to the brake pedal, the system including also an electric parking braking means for enabling the braking devices to be actuated for parking braking purposes, but which is also arranged to be actuated to supplement push-through braking in the event of failure of the brake-by-wire mode, the system being such that electro-hydraulic braking at the rear axle of the vehicle is allowed only when a control unit of the electro-hydraulic braking system has confirmation that the electric parking means is in a satisfactory operational state.

Preferably, the system includes electronic control units for controlling electro-hydraulic braking and electric parking braking, respectively, which are interconnected such that eletrohydraulic braking at the rear axle of the vehicle is allowed only when the control unit for electro-hydraulic braking has confirmation from the control unit for electric parking braking that the electric parking means is in said satisfactory operational state.

Advantageously, the control unit for electro-hydraulic braking is arranged to provide a first status signal to the control unit for electric parking braking whereby whenever a status signal indicative of electro-hydraulic braking being in a satisfactory operational state is received by the control unit for electric parking braking, the electric parking braking means responds only to parking braking control.

Also advantageously, the control unit for electric parking braking is arranged to provide a second status signal to the control unit for electro-hydraulic braking for providing said confirmation that the electric parking braking means is in said satisfactory operational state.

Preferably, said first and second status signals are transferred between the control units via a common link whereby if the link itself fails, neither status signal is transferred between the two control units.

BRIEF DESCRIPTION OF THE DRAWINGS

The invention is described further hereinafter, by way of example only, with reference to the accompanying drawings, in which.

DETAILED DESCRIPTION OF THE PREFERRED EMBODIMENT

Figure 1:
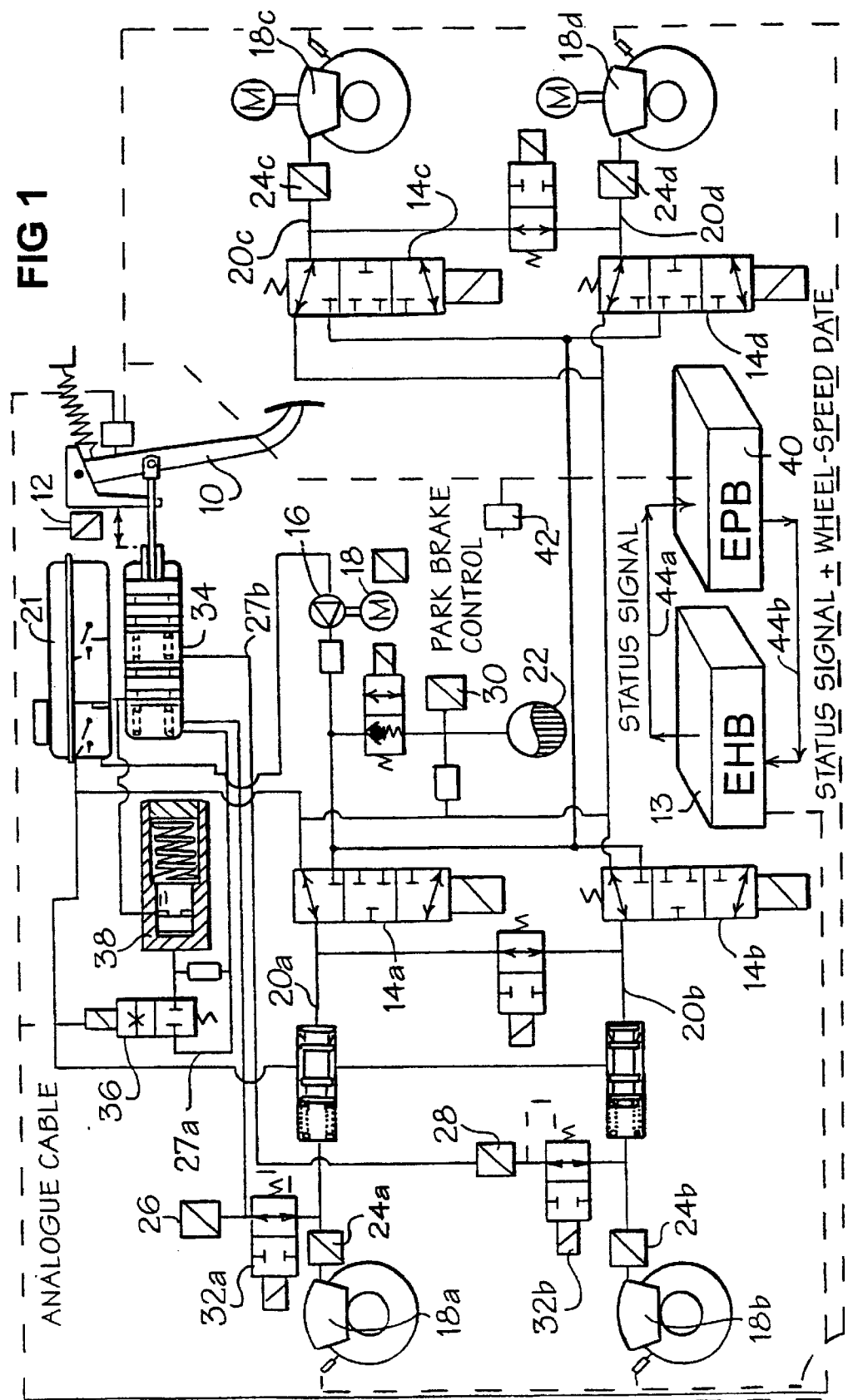
FIG. 1 is a schematic illustration of one embodiment of an electro-hydraulic braking system to which the present invention is applicable.

Referring first to FIG. 1, the illustrated EHB system comprises a brake pedal 10 with an associated sensor 12 for the acquisition of the driver's braking demand. The driver's demand is transferred to an electronic control unit (ECU) 13, evaluated there, and used as the source for the generation of electrical control signals for proportional solenoid control valves 14a, 14b, 14c, 14d, a hydraulic pump 16, wheel brakes 18a, 18b of one axle supplied with hydraulic fluid by electrically actuated brake channels 20a, 20b and wheel brakes 18c, 18d of the other axle supplied by electrically actuated channels 20c, 20d. Hydraulic fluid for the system is stored in a reservoir 231.

Under normal braking conditions, brake pressure modulation in the electrically actuated brake channels 20a, 20b, 20c, 20d is effected in a known manner by means of the proportional solenoid control valves 14a, 14b, 14c and 14d, the brake pressure being provided by a pressure accumulator/reservoir 22 whose pressure is maintained by the pump 16 operated by an electric motor 18.

Pressure sensors 24a and 24b monitor the hydraulic pressure at the wheel brakes 18a, 18b of the front axle and pressure sensors 24c and 24d monitor the hydraulic pressure at the wheel brakes 18c, 18d of the rear axle. Further pressure sensors 26, 28 monitor the pressure within push-through circuits 27a, 27b for the right and left front wheel brakes and a pressure sensor 30 monitors the supply pressure in the accumulator/reservoir 22. Respective solenoids 29 and 31 enable the brake channels 20a, 20b and 20c, 20d to be coupled together.

The push-through circuits 27a, 27b include respective solenoid controlled valves 32a, 32b to enable these circuits to be closed (open-circuited) during normal brake-by-wire operation.

The push-through arrangement includes a master-cylinder 34 coupled to the brake pedal 10 and to the circuits 27a, 27b, the master cylinder enabling the front brakes to be actuated manually in the event of failure of the brake-by-wire system. Coupled to the circuit 27b via a solenoid operated valve 36 is a travel simulator 38 which is activated hydraulically by master-cylinder pressure to give "feel" to the driver during push-through operation of the brakes. The connection between the master cylinder 34 and the travel simulator 38 is controllable by the electrically operated valve 36, so that unnecessary pedal travel can be avoided during manual actuation by closure of this valve.

Also shown diagrammatically in FIG. 1 is an electronic parking brake (EPB) control arrangement comprising an EPB ECU 40 and a park brake actuator/control 42 by which at least some of the brake actuators 18 can be operated electrically, for example by way of respective electric motors, to apply the foundation brakes for vehicle parking purposes.

The system described thus far is already known.

In the illustrated embodiment of the present invention, there is provided a first link 44a between the EHB and the EPB which is arranged to carry a status signal from the EHB to the EPB which shows the status of the EHB and in particular indicates to the FPB when the EHB is not functioning correctly. Whenever the EHB is functioning correctly, then the EPB is advised accordingly via the link 44a and is arranged to respond only to the parking brake control. However, if the EHB status signal is not received by the EPB ECU via the link 44a, then the parking brake is allowed to respond to, brake-pedal operation, as well as to parking brake control.

In addition to the link 44a, the illustrated embodiment includes a second link 44b carrying a second status signal, this time from the EPB to the EHB. In practice, the links 44a, 44b would be carried by the same wire/bus in different time slots in accordance with conventional techniques. The EHB is programmed such that EHB braking of the rear axle is allowed only when the EPB status signal indicates that the park-brake system is correct.

Thus, if the link 44a/44b carrying the status signals is intact and if the status signal is received by the EPB showing that the EHB is working correctly, then the EPB will work only in response to the parking-brake (EPB) control and it is not possible for overbraking to occur by the EHB and EPB being actuated together. Furthermore, the EHB will work normally, with braking taking place at the brake actuators of both the front and rear axles.

However, if the link 44a/44b fails for any reason, for example because of an open circuit fault, then as well as the EPB receiving no status signal from the EHB, the EHB receives no status signal from the EPB and is therefore constrained to work only on the front brakes (braking of the rear wheels being disabled as described above).

Thus, if the reason why the EPB receives no status signal from the EHB is that the link 44a is faulty rather than because the EHB itself is not functional, then although the EHB remains functional it only operates on the front brakes and it is unlikely that severe overbraking would result.

However, because EPB is not designed for the application of precisely-known braking torque, there is still some risk that the EPB may cause instability by locking the rear wheels. This problem can be addressed by arranging the system layout such that wheel speed data is available to the EPB ECU, even at times when the EHB is not working (see FIG. 1). It is then possible to use the technique of EBA (Electronic Brake Apportioning) so that, if the wheels tend to lock, the brake is released and the re-applied to a lower torque level. Alternatively, the EPB can be controlled in a manner similar to ABS—i.e. to cyclically apply and release the parking brakes in response to wheel-speed data.

Figure 2A:
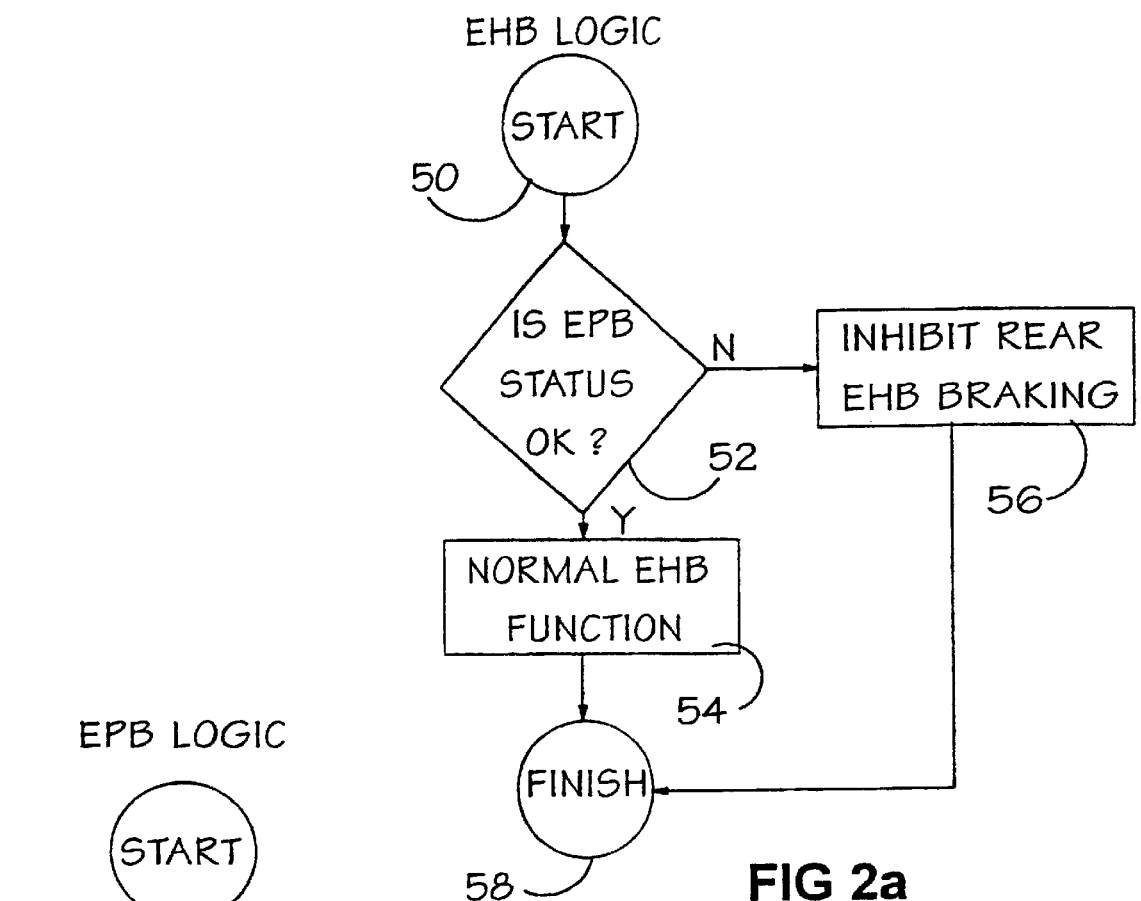
FIGS. 2a and 2b are sequence flow diagrams illustrating one possible routine for the operation of an embodiment in accordance with the present invention.
Figure 2B:
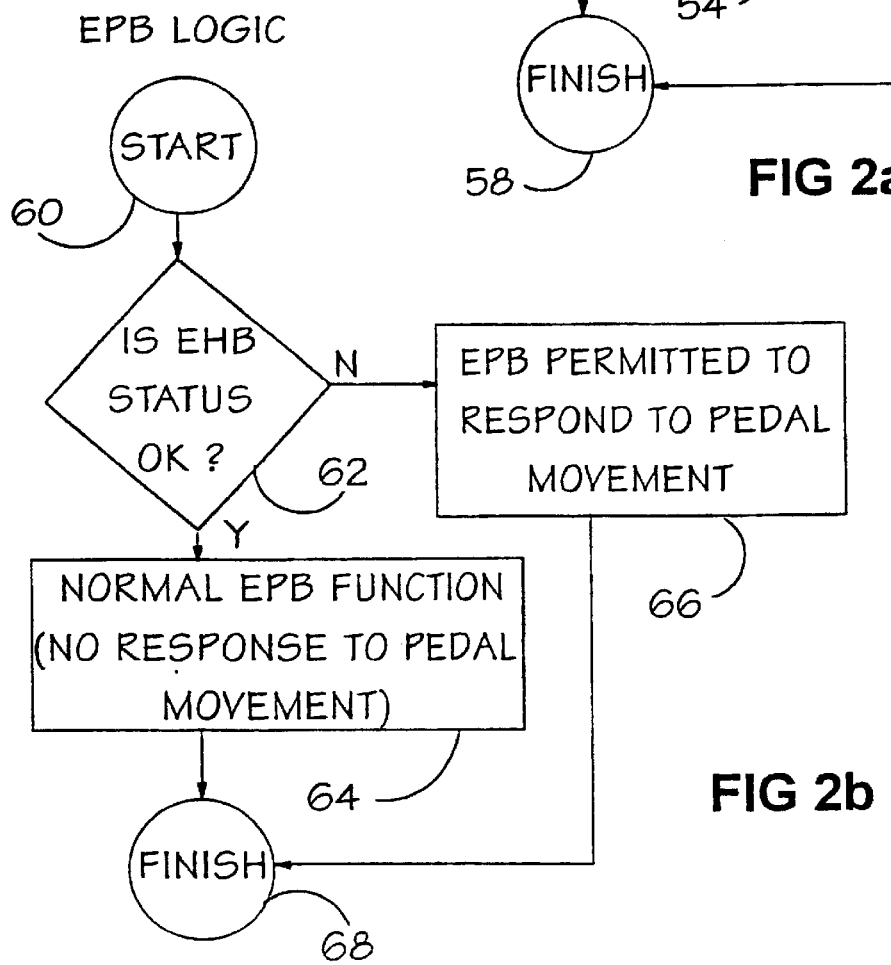

Simplified self explanatory flow diagrams illustrating the aforegoing operation of the EHB and EPB systems are shown in FIGS. 2a and 2b. The flow steps indicated in these diagrams are as follows:

50—Start
52—is EPB status OK?
54—Normal EHB function
56—Inhibit rear EHB braking
58—Finish
60—Start
62—is EHB status OK?
64—Normal EPB function (no response to pedal movement)
66—EPB permitted to respond to pedal movement
68—Finish

What is claimed is:

1. An electro-hydraulic braking system which operates normally in a brake-by-wire mode wherein hydraulic pressure is applied to braking devices at the vehicle wheels in proportion to the driver's braking demand as sensed electronically at a brake pedal, and which, if the brake-by-wire mode should fail, operates in a push-through mode wherein hydraulic pressure is applied to the braking devices at the vehicle wheels by way of a master cylinder coupled mechanically to the brake pedal, the system also including an electric parking braking means for enabling the braking devices to be acts for parking braking purposes, but which is also arranged to be actuated to supplement push-through braking in the event of failure of the brake-by-wire mode, the system being such that electro-hydraulic braking at the rear axle of the vehicle is allowed only when a control unit of the electro-hydraulic braking system has confirmation that the electric parking braking means is in a satisfactory operational state.

2. An electro-hydraulic braking system as claimed in claim 1, which includes electronic control units for controlling electro-hydraulic braking and electric parking braking, respectively, which are interconnected such that electrohydraulic braking at the rear axle of the vehicle is allowed only when the control unit for electro-hydraulic braking has confirmation from the control unit for electric parking braking that the electric parking braking means is in said satisfactory operational state.

3. An electro-hydraulic braking systems as claimed in claim 2, wherein the control unit for electro-hydraulic braking is arranged to provide a first status signal to the control unit for electric parking braking whereby whenever a status signal indicative of electro-hydraulic braking being in a satisfactory operational state is received by the control unit for electric parking braking, the electric parking braking means responds only to a parking braking control.

4. An electro-hydraulic braking system as claimed in claim 3, wherein the control unit for electric parking braking is arranged to provide a second status signal to the control unit for electro-hydraulic braking for providing said confirmation that the electric parking braking means is in said satisfactory operational state.

5. An electro-hydraulic braking system as claimed in claim 4 wherein said first and second status signals are transferred between the control units via a common link whereby if the link itself fails, neither status signal is transferred between the two control units.

* * * * *

UNITED STATES PATENT AND TRADEMARK OFFICE
CERTIFICATE OF CORRECTION

PATENT NO.    : 6,582,030 B2
DATED         : June 24, 2003
INVENTOR(S)   : Alan Leslie Harris It is certified that error appears in the above-identified patent and that said Letters Patent is hereby corrected as shown below:

<u>Column 5,</u>
Line 23, delete "acts" and insert -- actuated --.

Signed and Sealed this

Tenth Day of February, 2004

JON W. DUDAS
*Acting Director of the United States Patent and Trademark Office*